United States Patent [19]
Knight

[11] Patent Number: 5,193,735
[45] Date of Patent: Mar. 16, 1993

[54] SOLDER REFLOW OVEN

[75] Inventor: Isaac M. Knight, Lakeview Terrace, Calif.

[73] Assignee: Knight Electronics, Inc., San Fernando, Calif.

[21] Appl. No.: 912,286

[22] Filed: Jul. 13, 1992

[51] Int. Cl.$^5$ .............................................. B23K 3/00
[52] U.S. Cl. ..................... 228/42; 219/388; 219/400
[58] Field of Search .................. 228/42, 240; 219/388, 219/400

[56] References Cited

U.S. PATENT DOCUMENTS

| | | | |
|---|---|---|---|
| 2,369,706 | 2/1945 | Altmore | 432/144 |
| 2,731,732 | 1/1956 | Harris et al. | 34/18 |
| 2,795,054 | 6/1957 | Bowen, III | 34/35 |
| 2,981,528 | 4/1961 | Culp | 432/145 |
| 3,163,694 | 12/1964 | Ipsen | 266/252 |
| 3,548,514 | 12/1970 | Smith et al. | 34/232 |
| 3,564,648 | 2/1971 | Snow | 452/14 |
| 3,770,408 | 11/1973 | McCully | 219/400 X |
| 3,854,918 | 12/1974 | McKinstry | 65/30.1 |
| 3,999,306 | 12/1976 | Koch, II et al. | 34/225 |
| 4,012,190 | 3/1977 | Dicks et al. | 432/145 |
| 4,448,578 | 5/1984 | Brunet et al. | 432/72 |
| 4,548,191 | 10/1985 | Hwang | 126/21 A |
| 4,878,838 | 11/1989 | Verheyden | 432/8 |
| 5,069,380 | 12/1991 | Deambrosio | 228/42 |

FOREIGN PATENT DOCUMENTS 2803910  8/1978  Fed. Rep. of Germany ...... 219/400

Primary Examiner—Kenneth J. Ramsey
Attorney, Agent, or Firm—Thomas I. Rozsa

[57] ABSTRACT

The present invention is a unique solder reflow oven useful for annealing electronic parts through convective heating. It has an enclosed chamber with an entrance and an exit. A conveyor is located in the lower part of the chamber for transporting electronic parts from the entrance to the exit, and a diffuser plate is suspended in the upper part of the chamber. The diffuser plate has a central duct and a periphery edge. An entrance heater plate and an exit heater plate are mounted on the periphery edge of the diffuser plate and located proximal to the entrance and the exit of the chamber respectively. An impellar is mounted above the central duct of the diffuser plate for forming in the chamber a multiplicity of circulatory airstreams which are orginated from the impeller and circulating from above the diffuser plate, around the periphery edge of the diffuser plate, then between the diffuser plate and the conveyor and toward a lower central region below the central duct of the diffuser plate. The diffuser plate is positioned inside the chamber in a manner which causes the multiplicity of circulatory airstreams flow faster when above the diffuser plate but slower below the diffuser plate, so that graduated temperature zones are established by the air circulation without having excessive airflow over the electronic parts being annealed.

20 Claims, 2 Drawing Sheets

SOLDER REFLOW OVEN

BACKGROUND OF THE INVENTION

1. Field of the Invention

The present invention relates generally to the field of heating ovens. More particularly, the present invention relates to convective heating reflow soldering ovens for electronic parts.

2. Description of The Prior Art

Heating ovens have been widely used for various home use or industrial purpose. The following thirteen (13) patents were uncovered in the pertinent fields of the art.

1. U.S. Pat. No. 2,369,706 issued to Altamore on Feb. 20, 1945 for "Recirculating System for Gas Fired Ovens" (hereafter "Altamore Patent").

2. U.S. Pat. No. 2,731,732 issued to Harris, Jr. et al. on Jan. 24, 1956 for "Apparatus and Method for Setting and Drying Moisture Settable Ink" (hereafter "Harris Patent").

3. U.S. Pat. No. 2,795,054 issued to Bowen III on Jun. 11, 1957 for "Method and Apparatus for Heat Recovery from Drying Oven Effluents" (hereafter "Bowen Patent").

4. U.S. Pat. No. 2,981,528 issued to Culp on Apr.25, 1961 for "Drying System" (hereafter "Culp Patent").

5. U.S. Pat. No. 3,163,694 issued to Ipsen on Dec. 29, 1964 for "Recirculating Heat Treating Furnace" (hereafter "Ipsen Patent").

6. U.S. Pat. No. 3,548,514 issued to Smith et al. on Dec. 22, 1970 for "Heating Apparatus Employing Radiant and Convective Heat Means Usable as a Bake Oven" (hereafter "Smith Patent").

7. U.S. Pat. No. 3,564,648 issued to Snow on Feb. 23, 1971 for "Shucking Of Bivalves" (hereafter "Snow Patent").

8. U.S. Pat. No. 3,854,918 issued to McKinstry on Dec. 17, 1974 for "Method for Continuous Heat Treating of Glass Articles" (hereafter "McKinstry Patent").

9. U.S. Pat. No. 3,999,306 issued to Koch, II et al. on Dec. 28, 1976 for "Anti-pollution Drying Oven" (hereafter "Koch Patent").

10. U.S. Pat. No. 4,012,190 issued to Dicks et al. on Mar. 15, 1977 for "Annealing Lehr" (hereafter "Dicks Patent").

11. U.S. Pat. No. 4,448,578 issued to Brunet et al. on May. 15, 1984 for "Curing Oven for Enameled Wire and Control System Therefor" (hereafter "Brunet Patent").

12. U.S. Pat. No. 4,548,191 issued to Hwang on Oct. 22, 1985 for "Food Cooking Oven and Method" (hereafter "Hwang Patent").

13. U.S. Pat. No. 4,878,838 issued to Verheyden on Nov. 7, 1989 for "Process for the Thermal Treatment of More Particularly Substantially Flat Bodies of a Ceramic Material and Continuous Furnace for the Performance of the Process" (hereafter "Verheyden Patent").

The Altamore Patent disclosed an early gas fired oven. The oven has a recirculating system utilizing a blower device at one end of the conveyor. The blower device circulates the airflows longitudinally.

The Harris Patent discloses an apparatus and method for setting and drying moisture settable ink which utilizes a means for circulating and recirculating gas in the drying chamber comprised of an exhaust impeller to withdraw gas from a plenum. An impeller directs air way from a central region, circulating the air in two directions which is distributed by a plurality of spaced apart inverted troughs positioned over the conveying web. The circulated air is directed toward small inverted troughs with gaps at the sides and is specifically designed to distribute the air along a flat paper surface at the end of a conveyor system.

The Bowen Patent discloses a method and apparatus for heat recovery from drying oven effluents. In the oven the gases are continuously internally recirculated and a predetermined volume of effluents is continuously exhausted from the oven in order to maintain the concentration of solvent vapors at a safe level.

The Culp Patent discloses a drying system. The system comprises a plurality of open flame convection heaters focusing a stream of gaseous heating medium from above a conveyor into a chamber, in which the gaseous heating medium can circulate above and below the conveyor to establish accurate temperature distribution.

The Ipsen Patent discloses a recirculating heat treating furnace including a baffled impeller for moving air 360 degrees around the work object. The baffled impeller circulates air laterally toward a combustible gas which is also directed laterally toward the object.

The Smith Patent disclosed a heating apparatus employing radiant and convective heat means usable as a bake oven. Parallel heat radiating tubes supply heat to the chamber and in addition, the tubes have nozzle configurations which inject pressurized gas into the chamber thereby circulating gas in the chamber.

The Show Patent discloses an apparatus designed for shucking bivalves such as clams, oysters and scallops by means of enveloping said bivalves in a concentrated high-temperature medium. The heat source used in this apparatus is a flammable gas and an exhaust system is used un conjunction with the applied heat source which has an interference means presenting a negligible radiating surface which allow the flames to pass upwardly and around said interference means to form a uniform bed of flame.

The McKinstry Patent Discloses a method for continuous heat treating of glass articles. The method involves a process wherein burning gases are injected tangentially into the combustion zone and establish a swirling movement of the burning gas around the outside of the tunnel due to the cylindrical nature of the chamber, thereby allowing gases to freely swirl around the articles introduced into the chamber by conveyor.

The Koch Patent discloses an anti-pollution drying oven for drying applied coating material having volatile properties. It comprise a housing defined by a heating enclosure and an oven enclosure, using a flame heat source in conjunction with an air circulating means disposed in the heating enclosure. The air is directed toward an air inlet opening in which the conveying articles are disposed.

The Dicks Patent discloses an annealing lehr, used primarily for annealing glassware, in which the ware passes, by means of a conveyor, through a chamber where gases pass upward through a duct located at the central region of the chamber and are distributed by a circulating impeller outward and downwardly through configured ducts located at the sides of the chamber. The ducts at the sides of the chamber causes the gases to circulate to the ware from under the conveyor. One particular feature of the Dicks Patent relates to its method of circulating of the airflow. The airflow in the Dicks Patent process circulates around underneath the conveyor whereas in the present invention, the airstream interfaces with the circuit board surface from above.

The Brunet Patent discloses a curing oven for enameled wire. The curing oven utilizes a heat exchanger to preheat the circulated air.

The Hwang Patent discloses a food cooking oven. The oven has an impeller for directing a cooking medium toward a baffle which separates the cooking medium into two streams. One stream is caused to flow in the direction of the conveyor product, and the other stream is caused to flow in a direction opposite to the direction of product movement.

The Verheyden Patent discloses a thermal treatment of flat ceramic bodies using conveying rollers. The process comprises a heating zone, a firing zone and a cooling zone. A blower can be incorporated in the central region of the furnace where the gases in the heating zone are conducted in contraflow with the conveying direction of the bodies. The process also utilizes a bypass system for circulating gases around the heating zone and the heating zone itself is partitioned off. The parts then go to a firing zone where the bodies are very rapidly heated. The gasses before and after the central zone are flowing in the same direction from right to left.

There is a significant need for a solder reflow oven which comprises the many advantages discussed herein and which are not disclosed or made obvious by the prior art patent.

SUMMARY OF THE INVENTION

The present invention is a unique reflow soldering oven that maintains temperature zones through convection heating by utilizing gentle heated airstreams which do not disturb the electronic parts being conveyed through the reflow soldering oven.

Many different types of prior art heating ovens have been designed and manufactured for various purposes. However, none of the various types of prior art heating ovens are suitable for the purpose of soldering electronic parts. Part of the problem identified by the present invention is that delicate electronic parts are sensitive to the certain conditions under which the annealing is performed. Some of the present heat reflow ovens use infrared heat. The problem with using infrared is the penetrating heating effect of infrared will burn certain parts. Therefore, it is better to use heat convection which will not have this damaging effect.

One of the difficulties associated with the standard heat convection oven is that the airflow through the oven may blow some of the parts either completely off the mask or mis-orient them before they can be properly soldered in place. In the electronics industry, it is common to have a printed circuit board mask with the parts to be affixed by the heated solder reflow placed on a belt which runs through the oven which exposes the delicate parts to the hot air blowing through the standard convection oven. This effect can be very disturbing to some of the delicate electronic components.

In addition, in order to make the standard convection ovens workable, it is necessary that the standard convection ovens have a large multiplicity of stages for as many as ten to twelve zones wherein the temperature is gradually raised from 230 degrees centigrade to 260 degrees centigrade along a linear curve. These heat zones could involve separate heat sources to accurately maintain the desired temperature at each zone.

The present invention utilizes hot airstreams circulating within the convection oven to provide a desired temperature distribution, where a specific temperature is associated with a specific region within the oven. The nature of the way that the air is blown through the oven enables the air to be circulated in several paths around each convection heater which transfers heat to the airstream which is channeled over the conveyed electronic parts. The airstream circulation is designed in such a way that the airstream force is more diffuse in the region where the delicate electronic parts are annealed. The present invention essentially provides an apparatus to precisely control the temperature at specific regions within the oven without exerting an excessive airstream force on the parts which are being processed.

To carry the heat to the electronic parts which are being annealed within the solder reflow oven by convection, there is a main airstream and a secondary airstream, driven by a centrally located impeller over a generally rectangular diffuser plate which has heater plates at each edge of the diffuser plate. Each heater plate has a multiplicity of fins which help to guide the airstreams which originate from the impeller outward into various heating zones within the enclosed chamber.

The heating zones within the enclosed chamber are the preheat zone, the reflow zone and the cool-down zone. The temperature of these zones is controlled so there is a gradual heat-up at the preheat zone, a relatively constant temperature at the reflow zone, and a gradual cool-down at the cool-down zone.

The heated airstreams which transmit the heat to the electronic parts by convection are designed to circulate around the four edges of the diffuser plate and over the heaters which are mounted at the edges of the diffuser plate. The airstreams become heated along the fins of the convection heaters. The heater fins assist the airstreams to travel in generally straight lines.

The main airstreams are dispersed at the entry and exit zones of the enclosed chamber due to the larger volumes at these regions in relation to the high pressure region above the diffuser plate. A secondary airstream travels between a pair of oppositely located lateral heaters and the sidewalls of the enclosed chamber. The enclosed chamber surfaces are specially designed to accommodate the airstream circulation.

The pathways of the airflow are determined by the dimensions of the enclosed chamber and the diffuser plate and the various fins and plates along the airflow route. While the airstream circulation is designed to carry heat to the electronic parts and exhibit the desired temperature distribution in the heating zones, the airstream circulation is also designed to refrain from exerting an excessive airstream force which could disturb the electronic parts travelling on a conveyor at the lower part of the enclosed chamber.

It has been discovered, according to the present invention, that an enclosed chamber which circulates a heated main airstream will provide a linear temperature increase from the entrance of the chamber toward the central region of the chamber and a gradual decrease of temperature from the central region of the chamber toward the exit according to a desired thermal gradient suitable to anneal small electronic parts.

It has also been discovered, according to the present invention, that a centrally located impeller will drive circulating airstreams where the air will travel in such a manner that the airstream velocity is diminished in the region where delicate electronic parts are being conveyed, thereby preventing the delicate electronic parts from being disturbed in their respective positions and orientations.

It has been further discovered, according to the present invention, that a generally rectangular diffuser plate with a convection heater at each edge of the plate will heat the circulating air by convection and provide a temperature gradient through the enclosed chamber with a heat up zone and a cool down zone which is appropriate for annealing delicate electronic components.

It has been additionally discovered, according to the present invention, that by placement of the entrance and exit of the enclosed chamber a predetermined distance away from the heating plates at a region which is influenced by the heated main airstream, the temperature at the entrance and exit of the enclosed chamber will be attenuated in relation to the temperature at the region closer to the central region of the chamber, thereby establishing a temperature gradient suitable for annealing electronic components.

It has also been discovered, according to the present invention, that by guiding the heated main airstream with a multiplicity of fins and plates, and by sizing the enclosed chamber surfaces along the main airstream appropriately, the main airstream within the annealing oven will provide a double looping main airstream circulation wherein the main airstream travels a path from the central region through the central duct of the diffuser plate upward toward the impeller, outward from the region above the diffuser plate and driven by the impeller in two opposite directions along the upper surfaces of the entry heating plate and the exit heating plate, around the opposite outside edges of the entry heating plate and the exit heating plate to the region below the diffuser plate and completes the cycle at the central region between the two plates approaching from the two opposite lateral directions from under the diffuser plate, proceeding upwardly through the central duct so the separate streams combine to push up through the separation between the two plates to be circulated outwardly above the two plates in a continuous looping stream. In this manner the main airstream completes two separate loops around the diffuser plate.

It has been additionally discovered, according to the present invention, that a secondary airstream can be driven by the impeller above the diffuser plate, in a circulatory direction perpendicular to the main airstream, over the two lateral heater plates and through a gap spacing between the lateral heater plates and the sidewall of the enclosed chamber, under the diffuser plate and through the central duct of the diffuser plate to complete two separate secondary loops around the diffuser plate.

It has been further discovered, according to the present invention, that by guiding the air circulation with a multiplicity of fins and plates, and by sizing the enclosed chamber periphery along the main airstream appropriately, the airstream velocity can be guided so that, while it transfers heat appropriately, the airflow is significantly reduced to allow small delicate electronic components to be transported through the annealing cycle without disturbing their position on the conveyor.

It has also been discovered, according to the present invention, that exhaust vents at the entrance and exit of the enclosed chamber provide a means for venting noxious gases from the enclosed chamber.

It is therefore an object of the present invention to provide an enclosed chamber which circulates a heated main airstream which can provide a linear temperature increase from the entrance of the chamber toward the central region of the chamber, and a gradual decrease of temperature from the central region of the chamber toward the exit, according to a desired thermal gradient suitable to anneal small electronic parts.

It is also an object of the present invention to provide a centrally located impeller which can drive circulating airstreams wherein the air will travel in such a manner that the airstream velocity is diminished in the region where delicate electronic parts are being conveyed, thereby preventing the delicate electronic parts from being disturbed in their respective positions and orientations.

It is a further object of the present invention to provide a pair of heating plates to heat the main airstream by convection and provide a temperature gradient to various regions of the enclosed chamber which is appropriate for annealing delicate electronic components.

It is an additional object of the present invention to provide the placement of the entrance and exit of the enclosed chamber to be a predetermined distance away from the heating plates at a region which is influenced by the heated airstream. The temperature at the entrance and exit of the enclosed chamber will thus be attenuated in relation to the temperature at the region closer to the central region of the enclosed chamber to establish a temperature gradient suitable for annealing electronic components.

It is also an object of the present invention to guide the heated main airstream with a multiplicity of fins and plates, and by sizing the enclosed chamber surfaces along the main airstream appropriately, so that the main airstream within the annealing oven will provide a double looping main airstream circulation wherein the main airstream travels a path from the central region through the central duct of the diffuser plate upward toward the impeller, outward from the region above the diffuser plate and driven by the impeller in two opposite directions along the upper surfaces of the entry heating plate and the exit heating plate, around the opposite outside edges of the entry heating plate and the exit heating plate to the region below the diffuser plate, and completing the cycle at the central region between the two plates approaching from the two opposite lateral directions from under the diffuser plate, proceeding upwardly through the central duct so the separate streams combine to push up through the separation between the two plates to be circulated outwardly above the two plates in a continuous looping stream. In this manner the main airstream completes two separate loops around the diffuser plate.

It is an additional object of the present invention to provide a secondary airstream which could be driven by the impeller above the diffuser plate, in a circulatory direction perpendicular to the main airstream, over the two lateral heater plates and through a gap spacing between the lateral heater plates and the sidewall of the enclosed chamber, to a region under the diffuser plate and through the central duct of the diffuser plate to complete two separate secondary loops around the diffuser plate.

It is a further object of the present invention to provide a finely guided heated airstream circulation through a multiplicity of fins and plates, and by sizing the enclosed chamber periphery along the main airstream appropriately, so that the airstream velocity can be guided and while it transfers heat appropriately, the airflow is significantly reduced to allow small delicate electronic components to be transported through the annealing cycle without disturbing their position on the conveyor.

It is also an object of the present invention to provide exhaust vents at the entrance and exit regions of the enclosed chamber, to provide a means for venting noxious gases from the enclosed chamber.

The uniqueness of the present invention is: the rectangular diffuser plate with a central duct and the four finned convection heaters placed at the four edges of the rectangular diffuser plate; an impeller wherein the velocity of airflow is controlled by the impeller rotation, and the impeller is oriented so the blades of the impeller push the air out laterally over the horizontal plane surface of the rectangular diffuser plate; the main airstream circulation and the secondary airstream circulation which transfer heat to the electronic parts under anneal by convection heating but do not exert an excessive force on the electronic parts; the unique surface characteristics and volume regions designed so the enclosed chamber configuration could guide the airstream circulation; the exhaust vents at the entrance and exit of the enclosed chamber; and the control of the heater energy and impeller speed so that there is a gradual heat buildup zone at the entry and a gradual cool-down at the exit, with a reduced airflow along the conveying section so that the sensitive electronic parts will not be disturbed by an excessive airflow.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a thermal processing oven for solder reflow which distributes the temperature by a unique airflow which heats the air by convection heaters and circulates the air so that there is only an inconsequential stream of air flowing over the parts being conveyed throughout the system. The present invention reflow soldering oven comprises essentially a generally rectangular diffuser plate with a central duct and four finned convection heaters placed at the four edges of the rectangular diffuser plate, an impeller controlling the speed and direction of the airflows, and exhaust vents at the entrance and exit of the enclosed chamber. A main airstream and a secondary airstream circulation are formed by the design and construction of the reflow soldering oven to deliver a gradual heat buildup zone at the entry and a gradual cool-down zone at the exit of the oven, with a reduced airflow along the conveying section of the oven so that the sensitive electronic parts will not be disturbed by an excessive airflow.

Figure 1:
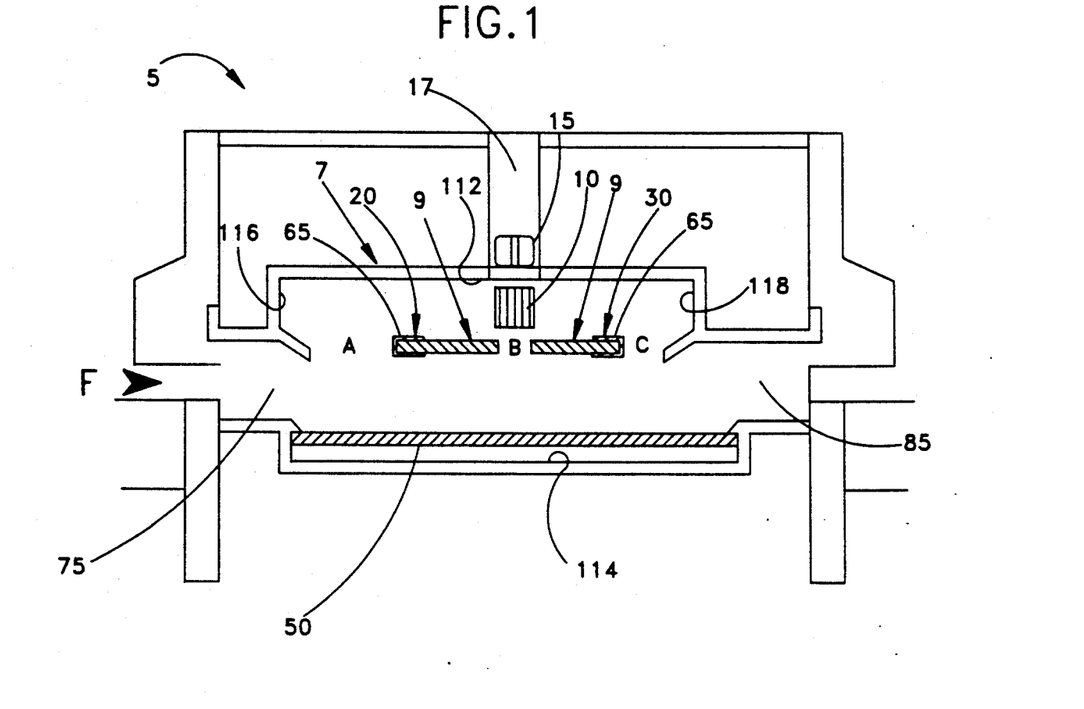
FIG. 1 is a longitudinal cross-sectional view of the preferred embodiment of the present invention, illustrating the components of the solder reflow oven.

Referring to FIG. 1, there is shown at 5 the reflow soldering oven. Within the reflow soldering oven 5 there is an enclosed chamber 7. The enclosed chamber 7 is generally longitudinally extended in length along the axis connecting the entrance channel 75 and the exit channel 85. The enclosed chamber is defined by a top wall 112, a bottom wall 114, a front wall 116, a rear wall 118 and two side walls 122 and 124 (side walls 122 and 124 are not shown in FIG. 1 but shown in FIGS. 4 and 5).

The electronic parts which need to be annealed in the reflow soldering oven are presented to the entrance channel 75, where they move through the enclosed chamber by means of a conveyor 50 which carries the electronic parts from the entrance channel 75 to an exit channel 85 in a direction indicated by arrow F.

Any annealing process involves a significant number of stresses and strains to the electronic components at the solder connections due to the different rates electronic parts under processing. It is therefore important to provide a gradual thermal treatment which avoids the problems associated with thermal shock. Thermal shock can lead to defects in the microstructure of the electronic parts at the points of connection between dissimilar materials and can cause long term reliability problems. The present invention avoids thermal shock by establishing heating zones where the temperature is gradually raised at the preheat zone A, maintained relatively constant at the reflow zone B and is gradually lowered at the cool-down zone C.

The temperature application to the electronic parts is therefore applied gradually with generally linear temperature zones for heat up and cool down. The largest variance in temperature is at the preheat zone A, located proximal to the enclosed chamber entrance channel 75. The annealing temperature is gradually raised from room temperature to approximately 230 degrees centigrade at this zone. The temperature is raised to approximately 260 degrees centigrade as the electronic parts proceed into the reflow zone B. The temperature in the reflow zone B is held relatively constant to allow the solder connections of the electronic parts to become fluid.

The reflow zone B is located in the central region of the enclosed chamber under the diffuser plate 9. Since the temperature in the reflow zone B is held relatively constant, there is a lower variance of temperature from point to point along the upper surface of the conveyor 50 which carries the electronic parts and interfaces the heat of the reflow zone B. The electronic parts then proceed to a cool down zone C, which gradually reduces the temperature to allow the solder connections to become tempered and strengthened while avoiding brittleness.

In a central region of the enclosed chamber 7 above the diffuser plate 9 is an impeller 10 which rotates to circulate the air in the enclosed chamber 7. The impeller 10 is positioned so the air is blown outward in all directions. The outward airflow flows over the entry heating plate 20 in one direction and over the exit heating plate 30 in the opposite direction. Above the impeller there is a motor mount 15 adjacent to a motor 17 to drive the impeller 10.

Figure 4:
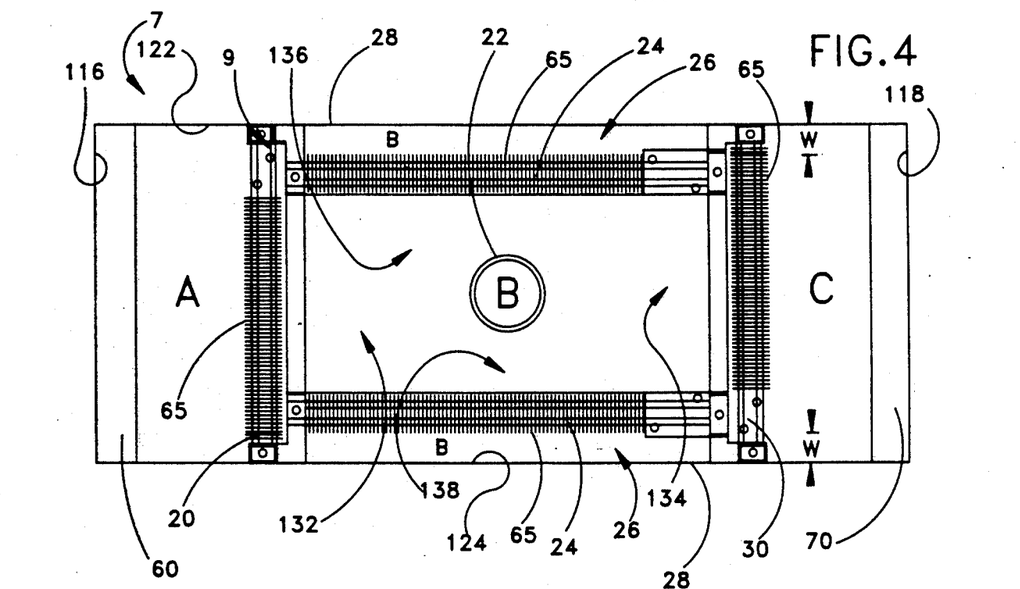
FIG. 4 is an interior top plan of the diffuser plate in the enclosed chamber, illustrating the directions of main airstream and the secondary airstream circulation.

Referring to FIG. 4, the diffuser plate 9 in the enclosed chamber 7 is shown as a generally rectangular, plate-like structure with a central duct 22 in the center and four heater plates at the four edges of the diffuser plate 9. The preheat zone A is shown nearest to the entrance heater plate 20.

The entrance heater plate 20 has a multiplicity of heater fins 65 which guide the air circulation in straight lines toward the preheat zone A generally outward. At the opposite edge of the diffuser plate 9 opposite to the entrance heater plate 20 is an exit heater plate 30. The exit heater plate 30 is nearest to the cool-down zone C. The exit heater plate 30 also has heater fins 65 which guide the airflow outward toward the cool-down zone C. The direction in which the heater fins 65 direct the airflow in the entrance heater plate 20 and the exit heater plate 30 is generally outward and the two outwardly looping airstreams which originate from the impeller 10 are the starting points of the main airstream circulation.

Perpendicular to the entrance heater plate 20 and the exit heater plate 30 are the lateral heater plates 24. The heater fins 65 located on all of the heaters channel the airstreams outward in straight lines as the air skims over the surface of the diffuser plate 9. There are respective gap spacings 26 between the lateral heating plates 24 and the side walls 122 and 126 of the enclosed chamber 7. The gap spacings 26 allow a secondary airstream circulation from above the lateral heater plates 24 to the reflow zone B under the diffuser plate 9.

Designations for the reflow zone B are, as observed in the top plan of FIG. 4, through the gap spacings 26 and the central duct 22. The entrance air fin 60 is observed in the preheat zone A and the exit air fin 70 is observed in the cool-down zone C. The entrance heating plate 20 is shown adjacent to the pre-heat zone A and the exit heating plate 30 is shown adjacent to the cool-down zone C.

Referring to FIG. 1, the entry heating plate 20 and the exit heating plate 30 are mounted at opposite ends of the diffuser plate 9. The diffuser plate 9 is placed slightly below the impeller 10, so that the airstream generated by the impeller 10 can skim over the top surface of all of the heating plates. The entry heating plate 20 and the exit heating plate 30 are placed at opposite ends of the diffuser plate 9. The impeller 10 is located above the central duct 22 of the diffuser plate 9. The impeller 10 rotates about a shaft which extends through a motor mount 15, suspended below a motor 17.

Figure 2:
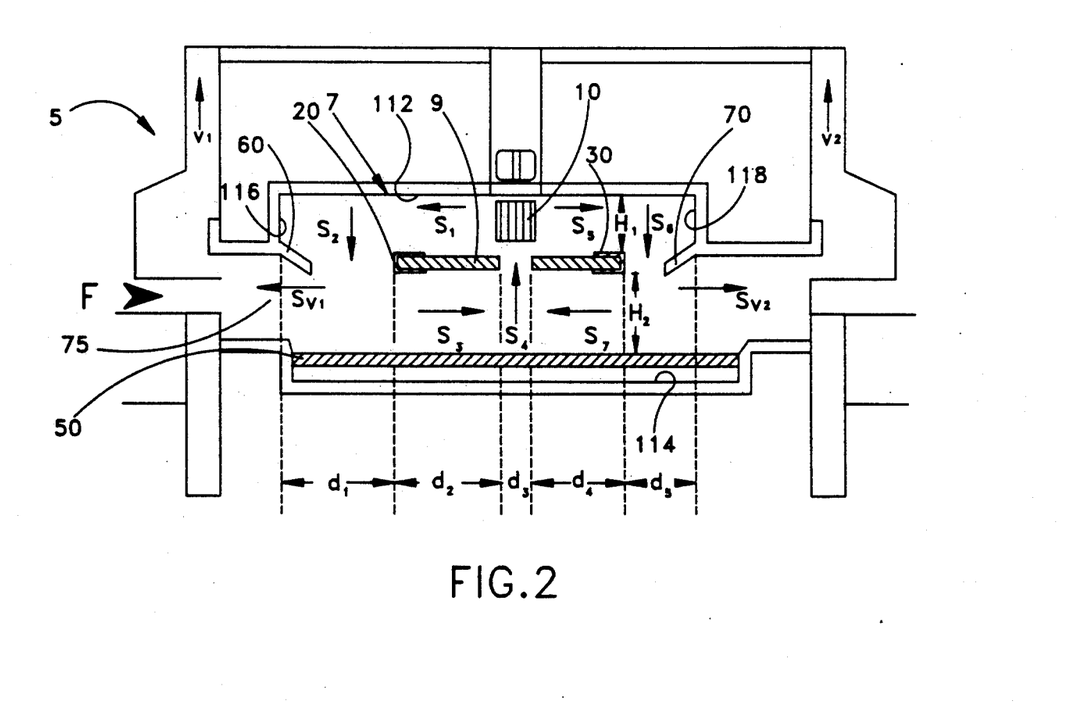
FIG. 2 is a longitudinal cross-sectional view of the preferred embodiment of the present invention, illustrating the direction of main airstream circulation.

Referring to FIG. 2, there is a central airflow S4 which flows up through the central duct 22 toward the impeller 10. The central duct diameter d3 is similar to the diameter of the impeller 10. The central airflow S4 which flows through the central duct 22 is generally a vortex of swirling air because it is fed toward the impeller 10 with air from all sides of the central region of the enclosed chamber 7 under the diffuser plate 9.

The diffuser plate 9 is shown with a lower plate height H2, which in comparison to the upper plate height H1 has been found to be effective when set at a 3:2 ratio, with the upper plate height H1 more narrow than the lower plate height H2. The widened lower plate height H2 allows the airstream to be less concentrated in force per unit of volume at the region under the diffuser plate 9, in comparison to the region above the diffuser plate 9. Since the airstream force is less concentrated under the diffuser plate 9, the electronic parts under anneal at the conveyor 50 will receive a relatively lessened airflow.

The impeller 10 rotates with an action which forces a high pressure zone above the diffuser plate 9, causing a relatively low pressure zone below the diffuser plate 9. In a steady state condition, the high and low pressure zones of the enclosed chamber will not change with time. The enclosed chamber 7 approaches equilibrium by allowing a constant airstream to smoothly flow from the high pressure to low pressure within the enclosed chamber 7. The airstream travels the path of least resistance.

Figure 3:
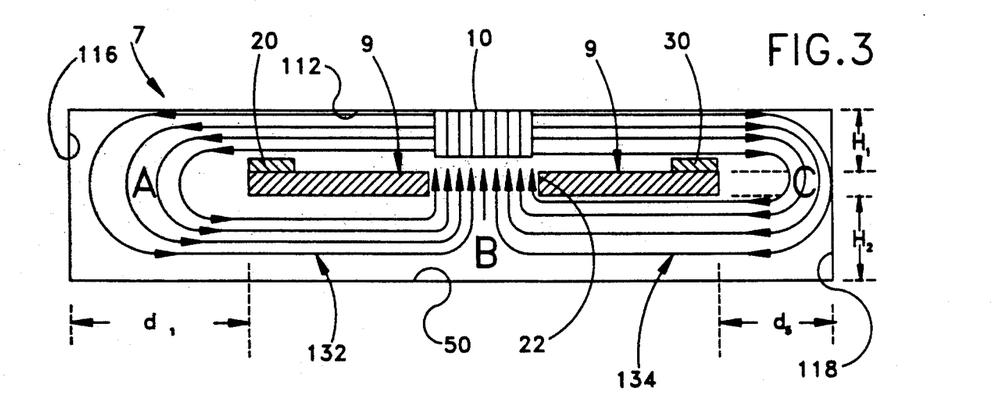
FIG. 3 is a partial cross-sectional view of the preferred embodiment of the present invention, showing the flow pattern of the main airstream circulation.

Referring to FIG. 3, the main airstream path is shown. The main airstreams include an entrance main airstream 132 and an exit main airstream 134. Although the impeller 10 generates a high velocity air outward above the diffuser plate 9 in all directions, the air will tend to carry more air current through the path of least resistance. The paths of least resistance are over the entrance heater plate 20 in one direction and over the exit heater plate 30 in the opposite direction.

The air circulates around the diffuser plate 9 into the preheat zone A and the cool-down zone C where the larger volume disperses the air current, thereby slowing the velocity the air current and diminishing the molecular concentration heated air in these zones, causing lower temperatures in the preheat zone A and the cool-down zone C. The cooler air from the preheat zone A and the cool-down zone C then proceeds to the reflow zone B, where the main airstream is combined with the secondary airstream and the concentration of all the airstreams provide a heated air which is maintained at a generally high temperature in the reflow zone B.

Referring to FIG. 2, in the first direction away from the impeller 10 the high velocity entrance airflow S1 is propelled over the top surface of the diffuser plate 9 toward the entry heating plate 20, where the heat energy from the entry heating plate 20 is transferred to the high velocity entrance airflow S1 by convection. The entry heating plate 20 has a multiplicity of heater fins 65, shown in FIG. 4, which direct the air in generally straight line streams outward.

Referring again to FIG. 2, continuing along the main airstream, the high velocity entrance airflow S1 leads to an entrance passage airflow S2 where the volume of the A is significantly widened which slows down the velocity of the main airstream considerably. Although the quantity of air mass transported is generally the same in the widened passage as in the narrow passage, the velocity is slower because the air mass is distributed over a larger cross sectional area when the main airstream completes the transition from a narrowly bounded area to a divergently larger area. Therefore, the entrance passage airflow S2 is more gentle in the preheat zone A than at the high velocity entrance airflow S1.

A portion of the main airstream at the entrance passage airflow S2 can travel toward the entrance vent stream SV1 and up the vent V1 which is usually maintained at a negative pressure with respect to the pressure of the enclosed chamber. However, the majority of the main airstream travels toward the central region of the enclosed chamber 7, below the diffuser plate 9 at a lower velocity entrance flow S3.

The entrance air fin 60 assists the entrance passage airflow S2 toward the lower velocity entrance flow S3 in the forward F direction which is along the same direction as the conveyor 50. The entrance air fin 60 is located above and proximal to the entrance channel 75. The entrance air fin 60 is oriented to cause a majority of the main airstream circulation to flow inward smoothly toward the region of the lower velocity entrance flow S3.

The lower velocity entrance flow S3 travels with a resultant gentle airstream force due to the dispersion of the airstream with respect to the original strength exerted at the impeller 10, and does not disturb the electronic parts which travel on the conveyor 50 at the lower boundary of the lower velocity entrance flow S3. From the lower velocity entrance flow S3, the main airstream travels upward at the central airflow S4 which is located below the central duct 22.

Starting again at the impeller 10, the high velocity exit airflow S5 is propelled over the top surface of the diffuser 9 toward the exit heating plate 30, where the heat energy from the exit heating plate 30 is transferred to the second loop of the main airstream in the exit direction. This second loop of the main airstream proceeds into the exit passage airflow S6, where a portion of the stream divides into the exit vent stream SV2 and the main airstream continues to lower velocity exit flow S7. The exit passage airflow S6 is similar to the entrance passage airflow S2. However, at the exit the cross-sectional area which the air passes through is not as wide as the cross sectional area at the entrance. The more narrow cross sectional area of the exit passage airflow S6 is due to the fact that it is not as necessary to have as gradual temperature heating zones at the exit as it is at the entrance of the chamber.

There is an exit air fin 70 placed above and proximal to the exit channel 85. Once again, the exit air fin 70 directs the main airstream circulation toward the central region of the enclosed chamber 7. The lower velocity exit flow S7 is therefore directed to the central airflow S4.

The vent system is fed from the entrance vent stream SV1 and the exit vent stream SV2, which leads to an entry vent V1 and an exit vent V2 respectively. The vent system can be connected to a main exhaust system. The specification of a vent system, although dependent on the type of trace elements involved in processing, usually consists of a gas scrubber system which generally neutralizes abrasive gases and prevents harmful gases from being expelled from the reflow soldering oven process containment into the atmosphere. Since the inlet to most gas scrubber systems is at negative pressure, the junction of the reflow soldering oven vent system to a gas scrubber exhaust system would also present a constant negative pressure source to the vent system and would additionally regulate the main airstream circulation. The inclusion of a vent exhaust system should therefore be considered in the airstream equation.

The main airstream circulation in the enclosed chamber 7 can be summarized as follows. The main airstream is forced from the impeller 10 and sent in all directions over the surface of the diffuser plate 9. The high velocity entrance airflow S1 and the high velocity exit airflow S5 proceed over the entrance heater plate 20 and the exit heat plate 30 respectively. The two main airstreams then curve downward over the heater plates to the entrance passage airflow S2 and the exit passage airflow S6 respectively.

Although a portion of the main airstream travels to the two vent channels, namely the entrance vent stream SV1 and the exit vent stream SV2 respectively, most of the main airstream is directed, with the assistance of the entrance air fin 60 and the exit air fin 70, toward the region below the diffuser plate 9. At this point, the main airstreams travel below the diffuser plate 9 at the lower velocity entrance flow S3 and the lower velocity exit flow S7 to combine at the central airflow S4 located below the impeller 10 and under the central duct 22 where the central airflow S4 feeds back to the impeller 10.

The enclosed chamber lateral dimensions are shown in FIG. 2. The dimensions of length d1, d2, d3, d4 and d5 describe the inner chamber with respect to the main airstream circulation regions and influence the heat distribution.

The preheat zone distance d1, will determine the number of heating zones at the entry. By elongating the preheat zone distance d1, the temperature increase at the entry of the chamber becomes more gradual. A longer entry zone distance d1 would also tend to slow the main airstream velocity at the entrance passage airflow S2.

The entry distance d2 defines the length of the high velocity airflow S2 from the entrance heating plate 20 to the central duct 22 located on the diffuser plate 9. The central duct diameter d3 is shown similar to the diameter of the impeller 10. However, the central duct diameter d3 could be any diameter which provides sufficient circulation for the central airflow S4 toward the impeller 10. The exit distance d4 is the length between the edge of the central duct 22 and the end of the exit heating plate 30. The exit zone distance d5, in a manner similar to the entry zone distance d1, determines the gradual temperature decline at the exit of the enclosed chamber 7.

Additionally, there is an assortment of fins and specially chosen enclosed chamber surfaces which generally guide the main airstream so there is an efficient transfer of heat from the heater plates by convection through the main airstream to the electronic parts under anneal. The fins and surfaces are also chosen to reduce the airflow on the electronic parts as they travel on the conveyor 50.

The main airstream is a double looping hot air circulation system for convection heating of electronic parts wherein the two main airstreams travel outward from the impeller 10, over the top surface of the two heater plates, around the edges of the heater plates and below the heater plates, finally joining the two streams and funneling upward toward the impeller 10 to complete the cycle and circulate outward again, driven by the rotation of the impeller 10. The main airstream velocity is sufficiently reduced in the region near the electronic parts so they are not disturbed during annealing.

Referring to FIG. 3, an airflow diagram shows the main airstream circulating in directions outward from the impeller 10. The airstream circulates toward the preheat zone A in one direction, and the cool-down zone C in the other direction. It should be noted that the airstream lines in the preheat zone A diverge because of the extended length dimension of the enclosed chamber 7 at the entry zone distance d1 of the preheat zone A as compared to the exit zone distance d5 of the cool-down zone C. The air from the preheat zone A and the cool-down zone C combines at the center of the reflow zone B where it travels upward through the central duct 22 toward the impeller 10 to continue another cycle.

Referring to FIG. 4, a top plan view of the diffuser plate 9 is shown encased by the enclosed chamber 7. The preheat zone A and the cool-down zone C are shown at the sides of the diffuser plate 9. Since the diffuser plate 9 is blocking most of the reflow zone B located below the diffuser plate 9, the reflow zone B can be seen through the gap spacing 26 between the lateral heating plates 24 and the chamber side walls 122 and 124. The reflow zone B can additionally be observed through the central duct 22.

Shown in FIG. 4, the airstreams in the enclosed chamber include two main airstreams: the entrance main airstream 132 and the exit main airstream 134. The airstreams in the enclosed chamber further include two secondary airstreams 136 and 138, thereby providing another path for air circulation to travel in a path perpendicular to the direction of the main airstream. The main airstream flows outward over the entrance heater plate 20 and the exit heater plate 30 in the opposite direction.

Figure 5:
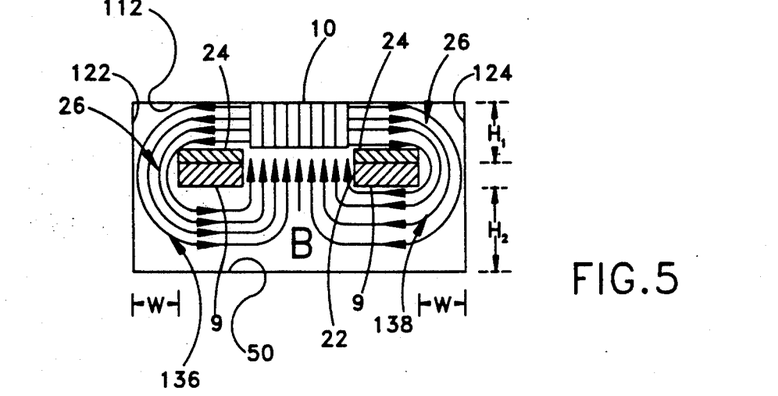
FIG. 5 is a partial cross-sectional view of the preferred embodiment of the present invention, showing the flow pattern of the secondary airstream circulation.

Shown in FIG. 5, the secondary airstreams 136 and 138 travel around the lateral heating plates 24 in the gap spacing 26 between the lateral heating plates 24 and the chamber side walls 122 and 124 respectively. The spacing width W at each gap spacing 26 will generally determine the secondary airstream flow through this gap spacing 26.

The present invention has many advantages. The temperature gradient describes the temperature associated with the position at various points within the oven. In the present invention, the temperature gradient is dependent on the impeller rotation, the energy to the convection heaters and the airstream route. An increased impeller rotation will cause the airstream velocity to be greater, thereby concentrating the airstream into a more dense airstream of heated air. The airstream will therefore be at a higher pressure when the impeller rotation is increased. The energy transfer of the heating elements in the convection heaters to the airstream is facilitated by means of a matrix of fins where the airstream skims across the surface of the convection heater. The fins at the surface of the heaters tend to guide the air into narrow airstreams. The heated energetic air at the interfacing boundary region between the surface of the heater and the region above the heater becomes transferred to the airstream by convection where the heated air joins the circulating air.

The main airstream path travels from the central impeller region toward the entrance and exit regions. The main airstream path is designed to guide the airflow outward from a centrally located impeller and over the surface of the diffuser plate toward a pair of diametrically located flat plate convection heaters. The impeller forces the air outward in two opposite lateral directions toward the preheat zone in one direction and toward the cool-down zone in the other. There is also a secondary airstream path to the lateral sides of the main airstream path wherein the secondary airstream path can flow over the side of the diffuser plate perpendicular to the main airstream path from the impeller.

The resultant temperature distribution due to the convection heated airflow as the parts proceed from the preheat zone toward the reflow zone is a gradually increasing temperature. As the electronic parts proceed from the the reflow zone to the cool-down zone, the temperature is gradually decreased. The zones which are separated from the impeller are designed to cause the airflow to be less dramatic so that parts will not be blown off of the printed circuit board mask or become mis-oriented.

The physical location and dimensions of the various zones within the oven contribute to the overall temperature characteristics of the solder reflow oven. For example, the entrance to the oven is distanced away from the entrance heater by a lengthened distance in relation to other zones closer to the central region of the oven. This lengthened distance causes the pre-heat zone to heat the electronic parts more gradually than if the distance from the entrance heater to the entrance of the enclosed chamber were reduced. As the airstream proceeds through the preheat zone, the lengthened distance of the entrance of the oven in conjunction with the unique airflow calibrates the temperature distribution at the preheat zone. The length of the cool-down zone at the exit of the oven is dimensioned according to the temperature gradient most appropriate for cooling.

In operation, electronic parts are placed on a belt which moves into the oven and exposes the electronic parts to the main airstream circulating through the oven. There is another airstream which the parts are exposed to as the parts exit the oven. This double airflow has been found to exhibit remarkably good properties of controlling the temperature gradient through convection heating while reducing the strength of the airstream which is exerted onto the surface of the electronic parts. In addition, there is a secondary airflow over the lateral sides of the enclosed chamber which additionally contributes to the temperature distribution in the reflow zone. There is also a vent flow which tends to reduce the airstream velocity as the air circulates past the parts which are being processed.

The entire oven is enclosed while the heating is taking place. Typically the beginning temperature within the oven is 230 degrees centigrade and it increases to 260 degrees centigrade almost instantaneously. However, due to the orientation of the impeller of the blower and the baffles, the airflow is sufficiently diminished so that parts will not be blown off the printed circuit board mask or become mis-oriented.

The key to the solder reflow oven airstream circulation plan is the diffuser plate. The diffuser plate is suspended in the central region of the enclosed chamber and comprises four heater plates located at the four edges of the generally rectangular diffuser plate. There is an entry heater plate, an exit heater plate, and two lateral heater plates. The entry heater plate is placed nearest to the entrance of the enclosed chamber and has fins running along the main airstream circulation path which serve to guide the airstream in straight line streams. The exit heater plate is located on the opposite edge on the other side of the impeller, parallel to the entry heater plate.

The two lateral plates are placed at the sides of the diffuser plate so that all four plates are generally at the edges of the diffuser plate. The two lateral plates being close to the sidewall of the enclosed chamber, have a gap spacing in front of them which allows a secondary airstream to flow through to the region below the diffuser plate. The two lateral plates also have fins which are placed along the direction through which the secondary airflow passes. The airstream from each circulatory path completes its circulation loop passing from below the diffuser plate through a central duct located at the center of the diffuser plate.

The high velocity airstream driven by the impeller and directed toward the entrance, is channeled between the entrance heater plate and the chamber ceiling. The airstream continues in this direction until it reaches the forward edge of the entrance heater where the stream spreads out from a more concentrated flow to a more dispersed condition due to the widened volume area at the preheat zone not restricted by the boundary of the diffuser plate. The more diffuse air in the preheat zone is at a lower pressure, with a corresponding lower airstream force than the higher airstream force resulting from a more concentrated flow at a higher pressure in the volume region bounded by the diffuser plate and driven by the impeller.

The main airstream continues past the edge of the entry heater plate and reaches an entrance wall which turns the main airstream downward and is assisted by an entry airstream fin which turns the main airstream toward the lower conveyor means and causes the air to be circulated back toward the central region of the chamber through the region under the entrance plate. The airstream fin also keeps the air from blowing directly onto the parts which are entering the chamber at the section of the conveyor located at the preheat zone. Some of the main airstream is vented at the entrance and exit to reduce the noxious gases in the enclosed chamber region.

When the main airstream reaches the center region of the chamber between the entrance heater plate and the exit heater plate located above, the air is sucked up toward the impeller through a central duct in the center of the diffuser plate. The main airstream is then directed outward again by the impeller, thereby completing a continuous loop.

In a similar manner, the air travels across the diffuser plate and around the exit heater plate. Therefore, in the present invention there are two continuous looping main airstream flows which diffuse the high velocity air sufficiently so that the airflow does not disturb the sensitive parts traveling on the conveyor below.

Some of the factors which have been considered to be important in the design of the chamber are the factors of airstream force, volume of the enclosed chamber, impeller motor velocity, rate of energy transfer to the heaters, and temperature, where each factor is considered to have an impact on the properties of temperature and airstream force associated to volume elements of the chamber, especially at the region where the electronic parts are traveling on the conveyor.

The entrance and exit convection heater plates are located on the generally rectangular diffuser plate on either side of the central duct. The two lateral convection heater plates are on the other two edges of the generally rectangular diffuser plate. In the center of the diffuser plate is the central duct. The central duct is a circular aperture, and is generally similar in diameter to the diameter of the impeller suspended above the central duct. The central duct of the heater plates creates a passage for the air to flow through from the region below the diffuser plate up toward the impeller at the region above the diffuser plate. The airflow is expelled from the impeller laterally outward over the top surface of the convection heater plates and channeled down and around the edges of the horizontally positioned plates, between the plates and the ends of the enclosed chamber. The airflow comes from an outward direction above the heater plates to an inward direction below the heater plates.

In addition to the main and secondary airstream, there is also a vent flow which allows some of the main airstream to circulate out from the exit and entrance region, thereby reducing the airflow onto the sensitive electronic parts which are traveling on the conveyor. The distance between the preheat zone entrance and the heater plate contributes to the temperature distribution characteristics at this region. A widened preheat zone will generally cause the temperature to be reduced at the entrance and a narrow preheat zone will cause a more concentrated hot airstream to flow through which will carry more heat per unit volume. Therefore, by controlling the preheat zone dimensions, one factor determining the temperature characteristics due to the hot airstream dissipation is thereby determined.

The main airstream travels across the flat surface of the diffuser plate outward and is guided over the entrance and exit heater plates. Each heater on the diffuser plate has fins which generally guide the interfacing air at the boundary region between the heater surface and the air above the heater surface. The fins in the heaters keep the main airstream guided outward, in generally straight line airstreams. The interaction between the heating elements and the interfacing air at the boundary region results in a significant heat transfer to the main airstream flowing above and below the heating plates.

The main airstream dynamics in the entrance loop and the exit loop cause the main airstream to complete its path through the lower part of the enclosed chamber, below the heater plates, until the two looping main airstreams funnel upward, traveling through the central duct passage in the center of the diffuser plate and the air is drawn toward the impeller located above the central duct. Due to the rotation of the impeller blades, the airflow is drawn up through the central duct and outward past the edges of the heater plates.

The steady state, continuous circulation of air creates a generally constant thermal gradient which is cooler in the region away from the plates at the preheat zone and gradually gets hotter as the electronic parts continue toward the central or reflow region of the enclosed chamber. At the exit, the hot air is, in a similar manner, cooled at an exit zone which again is distanced away from the hot airstream immediately interfacing the exit heater plate. The pre-heat zones, the reflow region and the cool-down region exhibit temperature characteristics of gradual heat up at the pre-heat zone, maintaining a generally high temperature for a period of time at the reflow region, and the temperature gradually decreases at the cool-down zone.

The temperature gradual heat-up characteristics at the entry region of the enclosed chamber can be determined by the separation distance of the entry passages away from the central diffuser plate region which is supplying heat to the air, through the heater plates, by convection. The conveyor entrance is separated in distance from the entrance heater plate. By increasing the distance between the conveyor entrance and the entrance heater plate, the temperature at the conveyor entrance is decreased. The temperature characteristics at the conveyor entrance are designed into the structure of the enclosed chamber, by setting the distance between the conveyor entrance and the entrance heater plate.

The impeller is the driving force for the air circulation. The impeller blows the air across the surface of the heating plates until it is channeled through the heaters. Since the impeller forcefully blows the air directly over the plates, there is a high velocity main airstream region above the diffuser plate. This high velocity air is guided outward in four directions, guided by the fins of each heater at the four edges of the diffuser plate.

The impeller is powered by a motor and rotational control system and can control the velocity of airflow. The impeller provides a means for controlling the rate of flow, and the rate of thermal heat transfer. Additionally, the thermal gradient will be dependent on the impeller power source. The faster impeller speeds will cause high pressure heated air to be transmitted farther away from the heat source. At lower speeds the hot air would tend to dissipate and be less concentrated (at lower pressure) at distances farther away from the heater.

The enclosed chamber is generally structured to be a lengthwise elongated chamber, with the entrance and exit along the axis of the length. The enclosed chamber dimensions as well as the diffuser plate dimensions will determine the distance that the air will flow past the heaters onto the electronic parts. The enclosed chamber airstream passages which the air circulates through and the generally longitudinal design, will determine the main airstream path and dependent temperature characteristics of the various regions within the enclosed chamber. The enclosed chamber will therefore direct the airstream through the various structural aspects of the enclosed chamber inner surface.

The enclosed chamber has supports for the conveyor system, the heaters, the impeller and motor and the air dispersion fins. The enclosed chamber also has an exhaust circulation loop at the entry and exit of the enclosed chamber. The exhaust circulation loop connects to exhaust vents which dissipate noxious gases which could be present in the printed circuit board which is being reflow soldered in the present invention.

In the present invention, the main airstream is designed to loop around the entrance heater and the exit heater, and become heated along the fins of the convection heaters. The airstream is dispersed at the entry and exit zones of the enclosed chamber due to the larger volumes at these regions in relation to the high pressure region above the diffuser plate. The pathways of the airflow are determined by the diffuser plate size and the physical dimensions of the airflow passages.

Defined in detail, the present invention is a solder reflow oven useful for annealing electronic parts through convective heating, comprising: (a) an enclosed chamber defined by a top wall, a bottom wall, a front wall with an entrance, a rear wall with an exit and two side walls, the chamber having an upper part and a lower part and enclosing three zones, including a preheat zone located proximal to the entrance, a cooldown zone located proximal to the exit and a reflow zone located between the preheat zone and the cooldown zone in the lower part of the enclosed chamber; (b) a conveyor located adjacent to said bottom wall of said chamber for transporting electronic parts from said entrance to said exit in said lower part of said chamber; (c) a generally rectangular shaped diffuser plate suspended horizontally in said upper part of said chamber, the diffuser plate having an upper surface and a lower surface, a front edge and an opposite rear edge and two lateral edges, and the diffuser plate further having a central duct; (d) an entrance heater plate mounted on said front edge of said diffuser plate proximal to said preheat zone, maintaining a front gap to said front wall of said chamber; (e) an exit heater plate mounted on said rear edge of the diffuser plate proximal to said cooldown zone, maintaining a rear gap to said rear wall of said chamber; (f) two lateral heater plates mounted respectively on said two lateral edges, maintaining respective lateral gaps to said two side walls of said chamber; (g) a multiplicity of heater fins mounted on each respective heater plate and oriented perpendicular to that respective heater plate, the heater fins being spaced apart in parallel and positioned vertically above each heater plate for allowing air flowing through with low resistance in generally straight streams in a general direction perpendicular to that respective heater plate; (h) an impeller rotatably mounted between said top wall of said chamber and said upper surface of said diffuser plate and above said central duct of said diffuser plate for forcing air to circulate around said diffuser plate, the rotation of the impeller forming in said chamber essentially a circulatory entrance main airstream and a circulatory exit main airstream, and two circulatory secondary airstreams; (i) said entrance main airstream being originated from said impeller and including a high velocity entrance airflow circulating above said diffuser plate between said top wall of said chamber and said upper surface of said diffuser plate and toward said front gap, an entrance passage airflow circulating around said entrance heater plate through said front gap, and a low velocity entrance airflow circulating below said diffuser plate between said lower surface of said diffuser plate and said conveyor and toward said central duct of said diffuser plate; (j) said exit main airstream also being originated from said impeller and including a high velocity exit airflow circulating above said diffuser plate between said top wall of said chamber and said upper surface of said diffuser plate and toward said rear gap, an exit passage airflow circulating around said exit heater plate through said rear gap, and a low velocity exit airflow circulating below said diffuser plate between said lower surface of said diffuser plate and said conveyor and toward said central duct of said diffuser plate; (k) said two secondary airstreams again being originated from said impeller and circulating from above said diffuser plate between said top wall of said chamber and said upper surface of said diffuser plate, around said two lateral heater plates respectively through said lateral gaps, and below said diffuser plate between said lower surface of said diffuser plate and said conveyor and toward said central duct of said diffuser plate; (l) said entrance and exit main airstreams and said two secondary airstreams finally forming a central airflow at a lower central region between said lower surface of said diffuser plate and said conveyor and below said central duct of the diffuser plate, the central airflow flowing upwardly through said central duct of said diffuser plate and toward said impeller to complete air circulation within said chamber; (m) an entrance air fin mounted on said front wall and located above said entrance of said chamber for guiding a substantially large portion of said entrance main airstream toward said lower central region; (n) an exit air fin mounted on said rear wall and located above said exit of said chamber for guiding a substantially large portion of said exit main airstream toward said lower central region; (o) an entrance exhaust vent located proximal to said entrance of said chamber for exhausting an entrance vent airstream, which is a small portion of said entrance main airstream, to expel noxious gases from said chamber; and (p) an exit exhaust vent located proximal to said exit of said chamber for exhausting an exit vent airstream, which is a small portion of said exit main airstream, to expel noxious gases from said chamber; (q) whereby said solder reflow oven can anneal electronic parts through convective heating, where graduated temperature zones are established by causing air circulation in the manner described above, without having excessive airflow over the electronic parts being annealed.

Defined broadly, the present invention is a solder reflow oven useful for annealing electronic parts through convective heating, comprising: (a) an enclosed chamber having an entrance and an exit, the chamber having an upper part and a lower part and enclosing a multiplicity of heating zones, including a preheat zone located proximal to the entrance, a cool-down zone located proximal to the exit and a reflow zone located between the preheat zone and the cool-down zone in the lower part of the enclosed chamber; (b) a conveyor located for transporting electronic parts from said entrance to said exit in said lower part of said chamber; (c) a diffuser plate suspended in said upper part of said chamber and having a central duct and a periphery edge; (d) an entrance heater plate and an exit heater plate mounted on said periphery edge of said diffuser plate and located proximal to said preheat and cool-down zones respectively; (e) an impeller rotatably mounted above said central duct of said diffuser plate for forcing air to circulate around said diffuser plate, the rotation of the impeller forming in said chamber essentially a circulatory entrance main airstream and a circulatory exit main airstream; (f) said entrance main airstream being originated from said impeller and circulating from above said diffuser plate at a high speed, around said entrance heater plate, then between said diffuser plate and said conveyor and toward said central duct of said diffuser plate; (g) said exit main airstream also being originated from said impeller and circulating from above said diffuser plate, around said exit heater plate, then between said diffuser plate and said conveyor and toward said central duct of said diffuser plate; and (h) said entrance and exit main airstreams finally forming a central airflow at a lower central region between said diffuser plate and said conveyor and below said central duct of the diffuser plate, the central airflow flowing upwardly through said central duct of said diffuser plate and toward said impeller to complete air circulation within said chamber; (i) whereby said solder reflow oven can anneal electronic parts through convective heating, where graduated temperature zones are established by causing air circulation in the manner described above, without having excessive airflow over the electronic parts being annealed.

Defined more broadly, the present invention is a solder reflow oven useful for annealing electronic parts through convective heating, comprising: (a) an enclosed chamber having an entrance and an exit, the chamber having an upper part and a lower part; (b) a conveyor located for transporting electronic parts from said entrance to said exit in said lower part of said chamber; (c) a diffuser plate suspended in said upper part of said chamber and having a central duct and a periphery edge; (d) at least two heater plates mounted on said periphery edge of said diffuser plate and located proximal to said entrance and said exit of said chamber respectively; (e) an impeller rotatably mounted above said central duct of said diffuser plate for forming in said chamber a multiplicity of circulatory airstreams which are originated from said impeller and circulating from above said diffuser plate, around said periphery edge of said diffuser plate, then between said diffuser plate and said conveyor and toward a lower central region below said central duct of said diffuser plate; (f) said diffuser plate positioned inside said chamber in a manner which causes said multiplicity of circulatory airstreams flow faster when above said diffuser plate but slower below said diffuser plate; (g) whereby said solder reflow oven can anneal electronic parts through convective heating, where graduated temperature zones are established by causing air circulation in the manner described above, without having excessive airflow over the electronic parts being annealed.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A solder reflow oven useful for annealing electronic parts through convective heating, comprising:
   a. an enclosed chamber having an entrance and an exit, the chamber having an upper part and a lower part;
   b. a conveyor located for transporting electronic parts from said entrance to said exit in said lower part of said chamber;
   c. a diffuser plate suspended in said upper part of said chamber and having a central duct and a periphery edge;
   d. at least two heater plates mounted on said periphery edge of said diffuser plate and located proximal to said entrance and said exit of said chamber respectively;
   e. an impeller rotatably mounted above said central duct of said diffuser plate for forming in said chamber a multiplicity of circulatory airstreams which are originated from said impeller and circulating from above said diffuser plate, around said periphery edge of said diffuser plate, then between said diffuser plate and said conveyor and toward a lower central region below said central duct of said diffuser plate;

f. said diffuser plate positioned inside said chamber in a manner which causes said multiplicity of circulatory airstreams flow faster when above said diffuser plate but slower below said diffuser plate; and g. whereby said solder reflow oven can anneal electronic parts through convective heating, where graduated temperature zones are established by causing air circulation in the manner described above, without having excessive airflow over the electronic parts being annealed.

2. The invention as defined in claim 1 further comprising a multiplicity of spaced apart heater fins mounted on each one of said at least two heater plates respectively for allowing air flowing through with low resistance in generally straight streams.

3. The invention as defined in claim 1 wherein said multiplicity of airstreams include an entrance main airstream circulating through a region proximal to said entrance of said chamber and an exit main airstream circulating through another region proximal to said exit of said chamber.

4. The invention as defined in claim 3 further comprising an entrance air fin located above said entrance of said chamber for guiding a substantially large portion of said entrance main airstream toward said lower central region.

5. The invention as defined in claim 4 further comprising an entrance exhaust vent located proximal to said entrance of said chamber for exhausting a small portion of said entrance main airstream to expel noxious gases from said chamber.

6. The invention as defined in claim 4 further comprising an exit air fin located above said exit of said chamber for guiding a substantially large portion of said multiplicity airstreams toward said lower central region.

7. The invention as defined in claim 6 further comprising an exit exhaust vent located proximal to said exit of said chamber for exhausting a small portion of said exit main airstream to expel noxious gases from said chamber.

8. A solder reflow oven useful for annealing electronic parts through convective heating, comprising:

a. an enclosed chamber having an entrance and an exit, the chamber having an upper part and a lower part and enclosing a multiplicity of heating zones, including a preheat zone located proximal to the entrance, a cool-down zone located proximal to the exit and a reflow zone located between the preheat zone and the cool-down zone in the lower part of the enclosed chamber;

b. a conveyor located for transporting electronic parts from said entrance to said exit in said lower part of said chamber;

c. a diffuser plate suspended in said upper part of said chamber and having a central duct and a periphery edge;

d. an entrance heater plate and an exit heater plate mounted on said periphery edge of said diffuser plate and located proximal to said preheat and cool-down zones respectively;

e. an impeller rotatably mounted above said central duct of said diffuser plate for forcing air to circulate around said diffuser plate, the rotation of the impeller forming in said chamber essentially a circulatory entrance main airstream and a circulatory exit main airstream;

f. said entrance main airstream being originated from said impeller and circulating from above said diffuser plate at a high speed, around said entrance heater plate, then between said diffuser plate and said conveyor and toward said central duct of said diffuser plate;

g. said exit main airstream also being originated from said impeller and circulating from above said diffuser plate, around said exit heater plate, then between said diffuser plate and said conveyor and toward said central duct of said diffuser plate; and h. said entrance and exit main airstreams finally forming a central airflow at a lower central region between said diffuser plate and said conveyor and below said central duct of the diffuser plate, the central airflow flowing upwardly through said central duct of said diffuser plate and toward said impeller to complete air circulation within said chamber;

i. whereby said solder reflow oven can anneal electronic parts through convective heating, where graduated temperature zones are established by causing air circulation in the manner described above, without having excessive airflow over the electronic parts being annealed.

9. The invention as defined in claim 8 wherein the distance between said diffuser plate and said conveyor is substantially larger than the clearance above said diffuser plate, causing the speed of air flowing below said diffuser plate to be substantially lower than that of air flowing above said diffuser plate.

10. The invention as defined in claim 8 further comprising a multiplicity of spaced apart heater fins mounted on each respective heater plate and oriented perpendicular to that respective heater plate for allowing air flowing through with low resistance in generally straight streams in a general direction perpendicular to that respective heater plate.

11. The invention as defined in claim 8 further comprising two opposite lateral heater plates also mounted on said periphery edge of said diffuser plate for providing evenly heating in said chamber.

12. The invention as defined in claim 8 wherein the rotation of said impeller also forms in said chamber essentially two circulatory secondary airstreams, which are originated from said impeller and circulate from above said diffuser plate, around said two lateral heater plates, then between said diffuser plate and said conveyor and toward said central duct of said diffuser plate.

13. The invention as defined in claim 12 wherein the position of said diffuser plate in said chamber is arranged in a manner which causes the amount of air of said entrance and exit main streams to be substantially more than the amount of air of said two lateral secondary airstreams.

14. The invention as defined in claim 8 further comprising an entrance air fin located above said entrance of said chamber for guiding a substantially large portion of said entrance main airstream toward said lower central region.

15. The invention as defined in claim 14 further comprising an entrance exhaust vent located proximal to said entrance of said chamber for exhausting a small portion of said entrance main airstream to expel noxious gases from said chamber.

16. The invention as defined in claim 14 further comprising an exit air fin located above said exit of said chamber for guiding a substantially large portion of said exit main airstream toward said lower central region.

17. The invention as defined in claim 16 further comprising an exit exhaust vent located proximal to said exit of said chamber for exhausting a small portion of said exit main airstream to expel noxious gases from said chamber.

18. A solder reflow oven useful for annealing electronic parts through convective heating, comprising:
 a. an enclosed chamber defined by a top wall, a bottom wall, a front wall with an entrance, a rear wall with an exit and two side walls, the chamber having an upper part and a lower part and enclosing three zones, including a preheat zone located proximal to the entrance, a cool-down zone located proximal to the exit and a reflow zone located between the preheat zone and the cool-down zone in the lower part of the enclosed chamber;
 b. a conveyor located adjacent to said bottom wall of said chamber for transporting electronic parts from said entrance to said exit in said lower part of said chamber;
 c. a generally rectangular shaped diffuser plate suspended horizontally in said upper part of said chamber, the diffuser plate having an upper surface and a lower surface, a front edge and an opposite rear edge and two lateral edges, and the diffuser plate further having a central duct;
 d. an entrance heater plate mounted on said front edge of said diffuser plate proximal to said preheat zone, maintaining a front gap to said front wall of said chamber;
 e. an exit heater plate mounted on said rear edge of the diffuser plate proximal to said cool-down zone, maintaining a rear gap to said rear wall of said chamber;
 f. two lateral heater plates mounted respectively on said two lateral edges, maintaining respective lateral gaps to said two side walls of said chamber;
 g. a multiplicity of heater fins mounted on each respective heater plate and oriented perpendicular to that respective heater plate, the heater fins being spaced apart in parallel and positioned vertically above each heater plate for allowing air flowing through with low resistance in generally straight streams in a general direction perpendicular to that respective heater plate;
 h. an impeller rotatably mounted between said top wall of said chamber and said upper surface of said diffuser plate and above said central duct of said diffuser plate for forcing air to circulate around said diffuser plate, the rotation of the impeller forming in said chamber essentially a circulatory entrance main airstream and a circulatory exit main airstream, and two circulatory secondary airstreams;
 i. said entrance main airstream being originated from said impeller and including a high velocity entrance airflow circulating above said diffuser plate between said top wall of said chamber and said upper surface of said diffuser plate and toward said front gap, an entrance passage airflow circulating around said entrance heater plate through said front gap, and a low velocity entrance airflow circulating below said diffuser plate between said lower surface of said diffuser plate and said conveyor and toward said central duct of said diffuser plate;
 j. said exit main airstream also being originated from said impeller and including a high velocity exit airflow circulating above said diffuser plate between said top wall of said chamber and said upper surface of said diffuser plate and toward said rear gap, an exit passage airflow circulating around said exit heater plate through said rear gap, and a low velocity exit airflow circulating below said diffuser plate between said lower surface of said diffuser plate and said conveyor and toward said central duct of said diffuser plate;
 k. said two secondary airstreams again being originated from said impeller and circulating from above said diffuser plate between said top wall of said chamber and said upper surface of said diffuser plate, around said two lateral heater plates respectively through said lateral gaps, and below said diffuser plate between said lower surface of said diffuser plate and said conveyor and toward said central duct of said diffuser plate;
 l. said entrance and exit main airstreams and said two secondary airstreams finally forming a central airflow at a lower central region between said lower surface of said diffuser plate and said conveyor and below said central duct of the diffuser plate, the central airflow flowing upwardly through said central duct of said diffuser plate and toward said impeller to complete air circulation within said chamber;
 m. an entrance air fin mounted on said front wall and located above said entrance of said chamber for guiding a substantially large portion of said entrance main airstream toward said lower central region;
 n. an exit air fin mounted on said rear wall and located above said exit of said chamber for guiding a substantially large portion of said exit main airstream toward said lower central region;
 o. an entrance exhaust vent located proximal to said entrance of said chamber for exhausting an entrance vent airstream, which is a small portion of said entrance main airstream, to expel noxious gases from said chamber; and
 p. an exit exhaust vent located proximal to said exit of said chamber for exhausting an exit vent airstream, which is a small portion of said exit main airstream, to expel noxious gases from said chamber;
 q. whereby said solder reflow oven can anneal electronic parts through convective heating, where graduated temperature zones are established by causing air circulation in the manner described above, without having excessive airflow over the electronic parts being annealed.

19. The invention as defined in claim 18 wherein the distance between said lower surface of said diffuser plate and said conveyor is substantially larger than the distance between said top wall of said chamber and said upper surface of said diffuser plate, causing the speed of air flowing between said lower surface of said diffuser plate and said conveyor to be substantially lower than the speed of air flowing between said top wall of said chamber and said upper surface of said diffuser plate.

20. The invention as defined in claim 18 wherein said front and rear gaps are substantially wider than said lateral gaps, causing the amount of air of said entrance and exit main streams to be substantially more than the amount of air of said two lateral secondary streams.

* * * * *